United States Patent [19]

Millar et al.

[11] 4,250,198

[45] Feb. 10, 1981

[54] MEAT SNACK ANALOG

[75] Inventors: Donald B. Millar, Cobourg; Edward D. Murray, Winnipeg; Terrence J. Maurice, Colborne, all of Canada

[73] Assignee: General Foods, Limited, Toronto, Canada

[21] Appl. No.: 51,787

[22] Filed: Jun. 25, 1979

[51] Int. Cl.$^3$ .......................... A23J 3/00; A23D 5/00
[52] U.S. Cl. .................... 426/335; 426/104; 426/602; 426/656; 426/613; 426/284; 426/802
[58] Field of Search ............ 426/104, 656, 802, 276, 426/512, 602, 613, 284, 335

[56] References Cited

U.S. PATENT DOCUMENTS

| | | | |
|---|---|---|---|
| 2,802,737 | 8/1957 | Anson et al. | 426/656 X |
| 3,713,837 | 1/1973 | Leidy et al. | 426/802 X |
| 3,836,678 | 9/1974 | Leidy et al. | 426/656 X |
| 3,922,352 | 11/1975 | Tewey et al. | 426/802 X |
| 4,133,897 | 1/1979 | Flanyak et al. | 426/802 X |
| 4,143,164 | 3/1979 | Shanbhaz et al. | 426/613 X |
| 4,169,090 | 9/1979 | Murray et al. | 426/656 X |
| 4,178,394 | 12/1979 | Kumar | 426/656 |

*Primary Examiner*—Robert A. Yoncoskie
*Attorney, Agent, or Firm*—Sim & McBurney

[57] ABSTRACT

A nutritious tasty meat snack analog having characteristics simulating the meat-based product is made from non-meat protein material, fat, water, spices, colorings and flavorings. The fat is emulsified in water with a proteinaceous food component emulsifier, preferably a protein micellar mass, and blended with an aqueous dispersion of a protein binder, which preferably is sodium caseinate or a protein micellar mass, and fibrous protein, preferably protein fibres formed from a protein micellar mass. The blend, which also includes the spices, colorings and flavorings, preferably along with preservatives, added at various stages of processing, and in the form of a stiff paste with fibrous particles distributed therethrough is then stuffed into appropriate casings, smoked and dried under controlled temperatures and humidity conditions to the desired moisture content, preferably about 15 to about 25% by weight, tempered and cut and packaged in a moisture-proof package.

18 Claims, No Drawings

MEAT SNACK ANALOG

TECHNICAL FIELD

The present invention is directed to a meatless food snack which simulates the taste, texture and other characteristics of dried meat snacks.

BACKGROUND ART

In prior art meat snacks, ground-up left-over meat from slaughterhouse operations, such as, beef or pork, is mixed, in desired proportions of lean and fat, with spices, preservatives and water binders, and continuously stuffed into suitable casings. The resulting material then is subjected to a smokehouse cycle to impart smokiness to the product and dry the same to the desired moisture level of about 12 to 20%. The product is then cut into the desired lengths for packaging, usually in an air tight foil package. These products are quite popular, have an acceptable nutritional value of about 25% by weight of meat protein, and have a long room temperature shelf-life.

The substitution of vegetable and other non-meat proteins for meat proteins in a number of meat products has been attempted, in view of the somewhat uneconomic and inefficient process whereby animals convert proteinaceous vegetable materials into meat, and other economic pressures, such as, limited grazing land for animals.

Consumer acceptance of meat-like products formulated from non-meat proteins is in large measure predicated on the extent of appearance, texture, taste and chewiness duplication of natural meat products and considerable difficulty often is experienced in meeting these requirements.

As far as the applicants are aware, any prior attempts which may have been made to provide a consumer acceptable meatless snack food having the taste, texture and other characteristics of the prior art meat-based products mentioned above have not been successful.

DISCLOSURE OF INVENTION

The present invention is directed to the provision of such meat snack analog based on non-meat proteins and which is room-temperature stable and has similar protein, moisture and fat contents to commercial meat snacks. In addition, the invention includes within its scope a product which simulates the polish sausage, produced by decreasing the preferred moisture content of the meat snack analog, and a sliced pepperoni analog, which is produced by slicing the meat snack analog.

The product of the present invention is preferably made from non-meat protein material, including texturing proteins, lipid material, water, and suitable spices, colourings and flavourings to simulate the taste and appearance of the meat-based products. The texturing proteins, which may be in the form of protein fibres and/or granules, impart a chewiness to the product which simulates meat-like characteristics.

The meat snack analog product of this invention is quite different from prior art sausage analog products which are intended to simulate hot dogs and the like. These prior art sausage analog products, such as are described in U.S. Pat. Nos. 3,711,291 3,713,837, 3,719,498, 3,719,499 and 3,836,678 assigned to General Foods Corporation, consist of gelled emulsions of protein in water from which fibrous material is substantially absent and have high moisture contents which necessitates refrigeration to prevent microbial spoilage. In contrast, the moisture content of the products of this invention permits room temperature storage without spoilage for long periods.

In the present invention, the component materials are brought together by a unique procedure which results in a thick paste-like material having texturing proteins distributed therethrough, which is stuffed into suitable casings and then subjected to the prior art smoking, drying, tempering, cutting and packaging operations.

The lipid material, such as, a fat or oil, is emulsified in water with a proteinaceous food component emulsifier, the emulsion is blended with an aqueous dispersion of a protein binder and a fibrous protein, and the spices, colourings and flavourings are introduced at various stages, to result in the thick paste having the fibres substantially uniformly distributed therethrough.

In the product of the invention, protein is present from three non-meat protein sources, namely, the proteinaceous emulsifier, the proteinaceous binder and the fibrous protein, and has a considerable lipid content. The protein and lipid contents of the products may be varied widely and generally it is preferred to provide values which are similar to those of commercial meat snacks.

The following Table I sets forth the various essential and optional components which may be present in the final product and their relative proportions:

| Component | General Range (% by wt.) | Preferred Range (% by wt.) |
|---|---|---|
| Non-meat proteins | | |
| -texturing protein | about 10 to about 70 | about 30 to about 50 |
| -binding and emulsifying proteins | about 5 to about 65 | about 10 to about 30 |
| Water | about 5 to about 35 | about 15 to about 25 |
| Lipid Material | about 10 to about 60 | about 25 to about 35 |
| Suitable spices, colouring agents and flavourings | up to about 15 | about 5 to about 10 |
| Antioxidant | up to about 1 | about 0.8 |
| Salt | 0 to about 10 | about 5 to about 6 |
| Sugars | 0 to about 35 | about 2 to about 4 |
| Preservatives- potassium sorbate | 0 to about 0.2 | about 0.1 |
| sodium nitrite | 0 to about 0.02 | about 0.02 |
| Antifoam agent | 0 to about 0.5 | about 0.01 |
| Acidifying agent and/or Bacterial culture | 0 to about 5 | 0 to about 0.1 |

The formation of the emulsified lipid material may be effected by mixing, usually under high shear, the lipid material which is preferably a liquid food grade vegetable oil or similar plant source material, although an animal fat may be used, if desired, and in which paste and liquid flavourings first may be dissolved and/or dispersed, with a dispersion or solution of a proteinaceous food emulsifier in water, which may have colouring agents and/or flavouring dissolved and/or dispersed therein. Salt may be dry mixed with dry protein emulsifier prior to dispersion of the latter in water. An emulsion stabilizing agent also may be included in the dry mix, if desired.

The dispersed mixture of fibrous protein in aqueous protein binder phase may be formed by mixing a dry protein binder with water to rehydrate and disperse and/or dissolve the same and then dispersing the fibrous protein in the aqueous medium under low shear conditions to minimize breakage of the fibrous protein. Fibrous proteins of various dispersions may be employed, generally of length of about 1 to about 15 cm, preferably about 1 to about 4 cm, and of diameter of about 0.1 to about 1 mm.

Powdered meat flavourings preferably are dry mixed with the dry protein binder prior to dispersing the latter in water. A food grade antifoam agent also may be added to the dry mixture, if desired. Colouring agents and/or flavourings may be added to the water prior to mixing with the dry protein.

The dispersed mixture of fibrous protein then is blended into the emulsion under low shear conditions and supplemental lipid material may be added to the blend, if desired. The emulsion may be blended directly with the dispersed mixture, or at least part of the emulsion first may be heat set to a gelatinous form to produce a simulated animal fat product, which then may be ground to particulate form, generally of an average size from about 0.1 to about 5 mm, prior to mixing of the ground material with the dispersed mixture of fibrous protein. Any portion of the emulsion not so heat set is used directly in the bleaching step.

It has been found that the oil-release characteristics of the final product may be varied depending on the relative proportions of the emulsion used directly and the heat set emulsion used, varying from a maximum oil-release value when all the emulsion is used directly to a minimum oil release value when all the emulsion is first heat set. The oil release and mouth feel characteristics of the product may also be modified by variations in additional quantities of supplemental lipid material added to the blend.

Once the blend has been formed any perservatives, sugar, acidifying agent and/or bacterial culture, any remaining salt, flavours and spices may be added. The resulting thick paste-like mix of fibrous particles generally has a moisture content of about 30 to about 70% by weight, preferably about 40 to about 60% by weight, these moisture-content values being typical of the commercial meat-based mixes used to form commercial meat snack products. This being the case, the prior art operations may be used thereon. The thick paste-like mix is fed to a sausage skin stuffer and the additional processing steps are effected to form a packaged product.

The preservatives may be conventional protein preservatives, such as, potassium sorbate and sodium nitrite. It is one feature of this invention that, surprisingly, sodium nitrite may be omitted from the added preservatives.

The texturing protein preferably is a fibrous protein, as is outlined in the above procedure. However, other texturing proteins may be used, alone or in admixture with the fibrous protein, such as, a granular textured vegetable protein.

When a granular textured vegetable protein is used to replace all or a part of the fibrous protein, the granular protein may be added to the emulsion so that the aqueous phase of the emulsion serves to rehydrate the granular protein. When this procedure is adopted, sufficient textured vegetable protein is added to form a fat-like semi-solid mass from the emulsion. The latter may be ground to particulate form, generally of an average size from about 0.1 to about 5 mm, prior to mixing of the ground material with the binder phase.

The fibrous protein used in this invention is preferably that described in our copending Canadian application Ser. No. 296,430 filed Feb. 3, 1978. Such fibrous protein is formed by heat coagulation of a protein micellar mass, preferably by injection into hot water.

Protein micellar mass is a unique protein isolate, the formation of which is described in our Canadian Pat. No. 1,028,552 and involves a controlled two-step operation, in which, in the first step, the protein source material is treated with an aqueous food grade salt solution at a temperature of about 15° to about 35° C., a salt concentration of at least 0.2 ionic strength, generally about 0.2 to about 0.8, and a pH of about 5.5 to about 6.5 to cause solubilization (or salting-in) of the protein, usually in about 10 to about 60 minutes, and, in the second step, the aqueous protein solution is diluted to decrease its ionic strength to a value less than about 0.1.

The dilution of the aqueous protein solution, which may have a protein concentration, for example, up to about 10% w/v, causes association of the protein molecules to form highly proteinaceous micelles which settle in the form of an amorphous highly viscous, sticky, gluten-like micellar mass of protein. The protein micellar mass so produced is referred to herein as PMM and is used to form the protein fibres. The wet PMM may be dried to a powder and the drying may be effected in any convenient manner, such as, spray drying, freeze drying or vacuum drum drying.

Improvements in the procedure described in Canadian Pat. No. 1,028,552 may be made to increase the yield of the unique protein isolate from the aqueous protein solution, as fully described in our copending Canadian application Ser. No. 299,713 filed Mar. 23, 1978.

The protein materials from which the wet PMM is formed may vary widely and include plant proteins, for example, starchy materials, such as, wheat, corn, oats, rye, barley and triticale; starchy legumes, such as, field peas, chickpeas, fababeans, navy beans and pinto beans; and oil seeds, such as, sunflower seeds, peanuts, rapeseed and soy beans; animal proteins, such as, serum proteins; and microbial protein, i.e, single cell proteins. Preferably, the protein source is a plant material owing to the readily-available nature of these materials.

The mild processing operations effected on the source protein to form the PMM ensure that the protein isolate is in a substantially undernatured form, as determined by calorimetry.

PMM, in powder form, may also be used as the binder protein in the products of this invention, although other protein binders, such as, sodium caseinate, may be used in place of all or part thereof. Further, PMM in powder form may be used as the proteinaceous food emulsifier, although powdered egg white also may be used, as a substitute for all or part thereof.

The invention is illustrated by the following Examples:

EXAMPLE 1

This Example sets forth a procedure for the formation of a snack food product according to the present invention.

A portion of the total quantity of salt to be used was dry mixed in a "Hobart Kitchen-Aid" (Trademark) mixer with dry PMM from a plant protein for 5 minutes at speed 1. Distilled water was warmed to 50° C., colour and maple essence were dissolved therein and one-third of this coloured water was rapidly mixed with the dry mix after setting the blender to speed 2. Mixing was continued for 30 minutes to ensure complete solvation of the PMM.

High stability vegetable oil was warmed to 60° C. and bacon and beef flavouring pastes were melted in the heated oil, the oil was cooled to room temperature and liquid pepperoni flavouring was added. The blender was set to speed 4, the oil was very slowly added to the PMM slurry and mixing was continued for 10 minutes to ensure complete emulsification of the oil in the aqueous phase.

Dry protein binder, either dry PMM from a plant protein or dry sodium caseinate, was dry mixed with two powdered beef flavourings for 5 minutes at speed 1. The blender was then set at speed 2 and the remainder of the coloured water was rapidly added with mixing being continued for 30 minutes to ensure complete solvation of the protein binder.

PMM fibres of varying diameters were hand mixed into the binder protein mass using the mixing paddle with care being taken to avoid air entrapment. The PMM emulsion formed as described above then was blended with the PMM fibre and binder with the mixer set at speed 1.

In 10 ml of water there were sequentially dissolved potassium sorbate, monosodium glutamate and sodium nitrite and the solution was blended into the mix at blender speed 1. After mixing for 2 minutes, the remainder of the salt, sugar and the rest of the flavours and spices as a premix were blended into the mix and the blending continued for 5 minutes at speed 2.

The resulting stiff paste having PMM fibres distributed therethrough was transferred to a sausage stuffer, wherein the mix was stuffed into a suitable casing. The stuffed sausage analog was reeled onto a frame, smoked and dried under controlled temperature and relative humidity conditions and cooled slowly to room temperature. After tempering the sausage analog for 24 hours at room temperature and relative humidity, the sausage analog was cut into desired meat snack lengths and placed in a moisture proof package.

In the following Example, the PMM used was formed from field peas. Equivalent results were obtained using PMM's formed from fababeans, soybeans and peanuts.

EXAMPLE 2

This Example set forth in Table II below the components of a formulation used to form the paste from which a meat snack analog was formed following the procedure of Example 1.

TABLE II

| Component | | % by Wt. |
|---|---|---|
| A. Coloured Water: | | |
| Water | | 33.52 |
| Colours | - Amaranth | 0.0046 |
| | - Sunset Yellow | 0.0061 |
| | - Caramel Colouring | 0.076 |
| Maple Essence | | 0.033 |
| B. Protein Binder Mix: | | |
| Pea PMM | | 4.58 |
| Sodium Caseinate | | 4.58 |
| Powdered Heated Beef Flavour | | 0.218 |
| Powdered Beef Flavour | | 0.109 |
| C. Protein Fibers: | | |
| Fine PMM (0.1 mm) | | 9.80 |
| Medium PMM (0.5 mm) | | 19.61 |
| Coarse PMM (1.0 mm) | | 3.27 |
| D. Oil Mixture: | | |
| High Stability Vegetable Oil | | 16.41 |
| Bacon Flavour Paste | | 0.218 |
| Beef Flavour Paste | | 0.218 |
| Liquid Pepperoni Flavour | | 0.109 |
| E. Preservative Solution: | | |
| Water | | 1.0 |
| Potassium Sorbate | | 0.109 |
| Sodium Nitrite | | 0.0087 |
| F. Other Ingredients: | | |
| Salt | | 3.27 |
| Sugar | | 1.63 |
| Flavour Premix | - Powdered Pepperoni Flav. | 0.109 |
| | - Salami Flavour | 0.381 |
| | - Ground Coriander | 0.109 |
| | - Onion Powder | 0.131 |
| | - Granular Garlic | 0.065 |
| | - Paprika | 0.054 |
| | - Smoke Flavour | 0.381 |

The moisture, fat and protein contents of the paste and the dried meat snack analog were determined. The results obtained were as follows:

| | Initial Paste (% by wt.) | Final Product (% by wt.) |
|---|---|---|
| Moisture | 55.8 | 23.3 |
| Fat | 17.0 | 29.5 |
| Total Protein | 20.6 | 35.8 |
| - Protein binder | 9.2 | 16.0 |
| - Protein fibres | 11.4 | 19.8 |

EXAMPLE 3

This Example sets forth in Table III below the components of a formulation used to form the paste from which the meat snack analog was formed, following the procedure of Example 1, except that sodium nitrite was omitted from the preservatives. The product in this Example utilizes only PMM to provide the protein content thereof.

TABLE III

| Component | | % by Wt. |
|---|---|---|
| A. Coloured Water: | | |
| Water | | 32.39 |
| Colours | - Amaranth | 0.0046 |
| | - Sunset Yellow | 0.0061 |
| | - Caramel Colouring | 0.076 |
| Maple Essence | | 0.08 |
| Potassium Sorbate | | 0.10 |
| B. Protein Binder Mix: | | |
| Pea PMM | | 17.65 |
| Sugar | | 1.50 |
| Salt | | 1.00 |
| High Stability Vegetable Oil (Anti-foaming Agent) | | 1.00 |
| C. Protein Fibres: | | |
| Fine PMM (0.1 mm) | | 3.0 |
| Medium PMM (0.5 mm) | | 14.06 |
| Coarse PMM (1.0 mm) | | 8.0 |
| D. Spices and Flavours: | | |
| Powdered Pepperoni Flavour | | 0.20 |
| Salami Flavour | | 0.30 |
| Ground Coriander | | 0.15 |
| Onion Powder | | 0.10 |
| Granular Garlic | | 0.60 |
| E. Oil Mixture: | | |
| High Stability Vegetable Oil | | 17.92 |
| Liquid Pepperoni Flavour | | 0.25 |
| Bacon Flavour Paste | | 0.16 |
| F. Other Ingredients: | | |
| Powdered Smoke Flavour | | 0.16 |

TABLE III-continued

| Component | % by Wt. |
|---|---|
| Salt | 2.0 |
| Monosodium Glutamate | 0.10 |

The moisture, fat and protein contents of the paste and dried meat snack analog were determined and the results obtained were as follows:

| | Initial paste (% by wt.) | Final Product (% by wt.) |
|---|---|---|
| Moisture | 48.7 | 21.1 |
| Fat | 19.3 | 29.8 |
| Total Protein | 26.4 | 40.7 |
| - Protein binder | 17.7 | 26.6 |
| - Protein fibres | 8.7 | 14.1 |

EXAMPLE 4

This Example sets forth in Table IV below the components of a formulation used to form the paste from which the meat snack analog was formed, following the procedure of Example 1:

TABLE IV

| Component | | % by Wt. |
|---|---|---|
| A. Coloured Water: | | |
| Water | | 25.9 |
| Colours | - Amaranth | 0.0053 |
| | - Sunset Yellow | 0.0070 |
| | - Caramel Colouring | 0.088 |
| Maple Essence | | 0.10 |
| B. Protein Binder Mix: | | |
| Sodium Caseinate | | 5.33 |
| Powdered Heat Beef Flavour | | 0.254 |
| Powdered Beef Flavour | | 0.127 |
| Coloured Water (See A above) | | 17.61 |
| C. Protein Fibres: | | |
| Fine PMM (0.1 mm) | | 7.61 |
| Coarse PMM (1.0 mm) | | 22.84 |
| Commercial Spun Protein Fibres | | 3.81 |
| D. Emulsifier Mix: | | |
| Pea PMM | | 5.33 |
| Salt | | 0.507 |
| Coloured Water (See A above) | | 8.49 |
| E. Oil Mixture: | | |
| High Stability Vegetable Oil | | 19.1 |
| Bacon Flavour Paste | | 0.254 |
| Beef Flavour Paste | | 0.254 |
| Liquid Pepperoni Flavour | | 0.317 |
| F. Preservative (etc.) Solution: | | |
| Water | | 1.27 |
| Potassium Sorbate | | 0.127 |
| Monosodium Glutamate | | 0.127 |
| Sodium Nitrite | | 0.01 |
| G. Other Ingredients: | | |
| Salt | | 3.30 |
| Sugar | | 1.90 |
| Flavour Premix | Powd. Pepperoni Flav. | 0.109 |
| | Salami Flav. | 0.381 |
| | Ground Coriander | 0.109 |
| | Onion Powder | 0.131 |
| | Granular Garlic | 0.065 |
| | Paprika | 0.054 |
| | Smoke Flavour | 0.381 |

Determination of the moisture, fat and protein contents of the paste and dried meat snack analog were made and the results were as follows:

| | Initial Paste (% by wt.) | Final Product (% by wt.) |
|---|---|---|
| Moisture | 49.7 | 21.2 |
| Fat | 19.9 | 31.2 |
| Total Protein | 22.6 | 35.4 |
| - Protein binder and emulsifier | 10.6 | 16.6 |
| - Protein fibres | 12.0 | 18.8 |

EXAMPLE 5

This Example set forth in Table V below the components of a formulation used to form the paste from which the meat snack analog was formed, following the procedure of Example 1 with the modifications that, following the formation of the emulsion, the protein was heat set and the heat set mass was ground prior to blending with the fibrous mass, smoke flavouring was added to the emulsion prior to heat setting to impart a smoky taste to the product, and additional oil was added to produce the desired oil-release and mouth-feel after blending of the ground mass and fibrous mass A mixture of PMM and sodium caseinate was used as the protein binder and a mixture of PMM, egg albumen and gelatin was used as the protein emulsifier.

TABLE V

| Component | | % by Wt. |
|---|---|---|
| A. Coloured Water: | | |
| Water | | 21.91 |
| Colours | - Amaranth | 0.0053 |
| | - Sunset Yellow | 0.0070 |
| | - Caramel Colouring | 0.027 |
| Maple Essence | | 0.154 |
| B. Protein Binder Mix: | | |
| Sodium Caseinate | | 6.92 |
| Pea PMM | | 0.768 |
| Food Grade Antifoam Agent | | 0.005 |
| C. Protein Fibres: | | |
| Medium PMM (0.25 mm) | | 30.72 |
| D. Heat-Set Emulsion (Smoke Flavoured)[1] | | 20.48 |
| E. Oil Mixture: | | |
| High Stability Vegetable Oil | | 5.12 |
| Liquid Smoke Flavour I | | 0.384 |
| F. Preservative (etc.) Solution: | | |
| Water | | 6.14 |
| Potassium Sorbate | | 0.102 |
| Monosodium Glutamate | | 0.102 |
| Sodium Nitrite | | 0.008 |
| Sodium Erythorbate | | 0.033 |
| G. Other Ingredients: | | |
| Liquid Smoke Flavour II | | 1.54 |
| Salt | | 2.76 |
| Dextrose | | 1.23 |
| Spice Premix | - White Pepper | 0.102 |
| | - Mace | 0.051 |
| | - Coriander | 0.092 |
| | - Mustard | 0.092 |
| | - Paprika | 0.061 |
| | - Onion Powder | 0.102 |
| | - Garlic Powder | 0.061 |
| Glucono Delta Lactone | | 1.02 |

Note:
[1]The constitution of the heat-set emulsion is set forth in the following Table VI

TABLE VI

Heat-Set Emulsion (Smoke Flavour)

| Component | % by Wt. |
|---|---|
| A. Dry Protein (etc.) Mix: | |
| Pea PMM | 2.66 |
| Egg Albumen (Powder) | 10.63 |

TABLE VI-continued

|   |   |   |
|---|---|---|
|   | Powdered Smoke Flavour | 0.089 |
|   | Sucrose | 3.545 |
|   | White Pepper | 0.099 |
|   | Hydrolyzed Vegetable Protein | 0.532 |
|   | Salt | 1.595 |
|   | Gelatin | 2.127 |
|   | Whey Protein Concentrate | 1.140 |
| B. | Aqueous Phase: |   |
|   | Water | 24.81 |
|   | Sodium Erythorbate | 0.043 |
|   | Liquid Smoke Flavour II | 1.33 |
| C. | Oil Mixture: |   |
|   | High Stability Vegetable Oil | 49.63 |
|   | Liquid Smoke Flavour I | 1.77 |

Results of the moisture, fat and protein contents of the paste and dried meat snack analog were as follows:

|   | Initial Paste (% by Wt.) | Final Product (% by Wt.) |
|---|---|---|
| Moisture | 54.9 | 26.4 |
| Fat | 16.0 | 26.1 |
| Total Protein | 21.8 | 35.5 |
| - Protein Binder and emulsifier | 11.0 | 18.0 |
| - Protein fibres | 10.8 | 17.5 |

EXAMPLE 6

This Example, in Table VII below, sets forth the constituents of a formulation used to form the paste from which the meat snack analog was formed following a modified procedure to that described in Example 1. The binder protein used was sodium caseinate while the emulsifier protein was egg albumen and gelatin.

In this Example, the protein in the emulsion was heat set after the formation thereof and the heat set mass was ground prior to blending with the fibrous mass as in the case of Example 4. In this Example, cheese flavouring was used to provide a cheese-flavoured product, and additional oil was added after blending of the ground mass and fibrous mass to produce the desired oil release and mouth feel.

TABLE VII

| Component |   |   | % by Wt. |
|---|---|---|---|
| A. | Coloured Water: |   |   |
|   | Water |   | 22.5 |
|   | Colours | - Amaranth | 0.0033 |
|   |   | - Sunset Yellow | 0.0044 |
|   |   | - Caramel Colouring | 0.017 |
|   | Maple Essence |   | 0.15 |
| B. | Protein Binder Mix: |   |   |
|   | Sodium Caseinate |   | 7.51 |
|   | Food Grade Antifoam Agent |   | 0.005 |
| C. | Protein Fibres: |   |   |
|   | Medium PMM (0.25 mm) |   | 30.0 |
| D. | Heat-Set Cheese-Flavoured Emulsion[1] |   | 20.0 |
| E. | Oil Mixture: |   |   |
|   | High Stability Vegetable Oil |   | 5.0 |
|   | Liquid Smoke Flavour I |   | 0.375 |
| F. | Preservative (etc.) Solution: |   |   |
|   | Water |   | 7.5 |
|   | Potassium Sorbate |   | 0.10 |
|   | Monosodium Glutamate |   | 0.10 |
|   | Sodium Nitrite |   | 0.008 |
|   | Sodium Erythorbate |   | 0.032 |
| G. | Other Ingredients: |   |   |
|   | Liquid Smoke Flavour II |   | 1.50 |
|   | Salt |   | 2.70 |
|   | Dextrose |   | 1.20 |
|   | Spice Premix | - White Pepper | 0.10 |
|   |   | - Mace | 0.05 |
|   |   | - Coriander | 0.09 |
|   |   | - Mustard | 0.09 |
|   |   | - Paprika | 0.06 |
|   |   | - Onion Powder | 0.10 |
|   |   | - Garlic Powder | 0.06 |
|   | Glucono Delta Lactone |   | 1.00 |

Note:
[1] The Constitution of the heat-set emulsion is as set forth in the following TABLE VIII.

TABLE VIII
Heat-Set Emulsion (Cheese Flavour)

| Component |   | % by Wt. |
|---|---|---|
| A. | Dry Protein (etc.) Mix: |   |
|   | Egg Albumen Powder | 11.29 |
|   | Sucrose | 3.01 |
|   | Salt | 1.35 |
|   | Gelatin | 1.81 |
|   | Whey Protein Concentrate | 0.753 |
|   | Natural Cheddar Cheese Flavour | 4.06 |
|   | Whey Powder | 3.39 |
|   | Natural Blue Cheese Flavour | 2.03 |
| B. | Aqueous Phase: |   |
|   | Water | 22.58 |
|   | Sunset Yellow | 0.009 |
|   | Sodium Erythorbate | 0.050 |
|   | Sodium Nitrite | 0.009 |
| C. | Oil Mixture: |   |
|   | High Stability Vegetable Oil | 48.91 |
|   | Liquid Smoke Flavour I | 0.753 |

The moisture, fat and protein contents of the paste and meat snack analog product were determined, the results being as follows:

|   | Initial Paste (% by Wt.) | Final Product (% by Wt.) |
|---|---|---|
| Moisture | 55.5 | 24.8 |
| Fat | 15.3 | 25.9 |
| Total Protein | 21.4 | 36.2 |
| - Protein binder and emulsifier | 10.9 | 18.5 |
| - Protein fibres | 10.5 | 17.7 |

EXAMPLE 7

In this Example, the procedure of Example 1 was again repeated except that in this case textured vegetable protein (TVP) granules were added to the emulsion. Sodium caseinate was used as the binder protein and PMM was used as the emulsifier protein. The constituents used are set forth in the following Table IX:

TABLE IX

| Component |   |   | % by Wt. |
|---|---|---|---|
| A. | Coloured Water for Binder: |   |   |
|   | Water |   | 18.60 |
|   | Colours | - Amaranth | 0.0053 |
|   |   | - Sunset Yellow | 0.0070 |
|   |   | - Caramel Colouring | 0.088 |
|   | Maple Essence |   | 0.081 |
|   | Liquid Smoke Flavour II |   | 0.404 |
| B. | Protein Dry Mix for Binder: |   |   |
|   | Sodium Caseinate |   | 6.072 |
|   | Antifoam Agent |   | 0.016 |
| C. | Protein Fibres: |   |   |
|   | Fine PMM (0.1 mm) |   | 16.17 |
|   | Coarse PMM (1.0 mm) |   | 16.17 |
| D. | Protein Dry Mix for Emulsion: |   |   |
|   | Pea PMM |   | 0.251 |
|   | Salt |   | 0.509 |
|   | Emulsion Stabilizer |   | 0.251 |
| E. | Aqueous Phase for Emulsion: |   |   |
|   | Water |   | 12.13 |
| F. | Oil Mixture for Emulsion: |   |   |

TABLE IX-continued

| Component | | % by Wt. |
|---|---|---|
| | Hydrogenated Vegetable Oil | 5.053 |
| | High Stability Vegetable Oil | 7.074 |
| | Liquid Smoke Flavour I | 0.404 |
| G. | Textured Vegetable Protein (Granules) | 6.468 |
| | (2.0 mm diameter) | |
| H. | Preservative (etc.) Solution: | |
| | Water | 6.468 |
| | Potasssium Sorbate | 0.081 |
| | Monosodium Glutamate | 0.081 |
| | Sodium Nitrite | 0.006 |
| I. | Other Ingredients: | |
| | Salt | 1.940 |
| | Sugar | 1.213 |
| | Spices - White Pepper | 0.10 |
| | - Mace | 0.05 |
| | - Coriander | 0.09 |
| | - Mustard | 0.09 |
| | - Paprika | 0.06 |
| | - Onion Powder | 0.10 |
| | - Garlic Powder | 0.06 |

The moisture, fat and protein contents of the paste and meat snack analog product were determined, the results being as follows:

| | Initial Paste (% by Wt.) | Final Product (% by Wt.) |
|---|---|---|
| Moisture | 58.7 | 21.4 |
| Fat | 12.5 | 23.8 |
| Total Protein | 20.9 | 39.7 |
| - Protein binder and emulsifier | 6.3 | 12.0 |
| - Protein fibers | 14.6 | 27.7 |

EXAMPLE 8

The procedure of Example 1 was repeated using the formulation of Example 5 except that varying proportions of PMM fibre were used, based on the overall composition, and in each case the hardness of the product, as determined by a texturometer was measured and the values compared with that of a commercial meat snack product. The results are reproduced in the following Table X:

TABLE X

| Sample | % PMM fibres (wt) | Hardness Texturometer Units[1] | Cohesiveness Units[2] |
|---|---|---|---|
| 1 | 10 | 33.8 | 0.74 |
| 2 | 20 | 36.3 | 0.79 |
| 3 | 30 | 40.6 | 0.78 |
| 4 | 40 | 41.1 | 0.87 |
| 5 | 50 | 47.8 | 0.82 |
| Commercial Meat Snack Product | — | 47.5 | 0.80 |

[1] Texturometer units = $\dfrac{1^{st} \text{ peak hgt.}}{\text{voltage (v)}} \times \dfrac{\text{mV recorder scale}}{2}$

[2] Cohesiveness units = $\dfrac{2^{nd} \text{ peak area}}{1^{st} \text{ peak area}}$ It will be seen from the results of the above Table X that the meat snack analog product made at 50 wt % PMM fibres had comparable hardness and cohesiveness values to the commerical meat snack product.

Taste tests by a panel of tasters also revealed comparable taste characteristics, such as, oil-release and mouthfeel, texture and chewiness and flavour, between the meat snack analog product made at 50 wt % PMM and the commercial meat snack product.

It will be apparent from the above description and Examples that the present invention provides a meat snack analog product utilizing proteins from non-meat sources. Modifications are possible within the scope of the present invention.

We claim:

1. In a method for the formation of a proteinaceous snack product by stuffing a substantially uniform mix of protein, lipid material, water, spices, seasonings and flavourings into a suitable casing, drying the stuffed material to a desired moisture content sufficiently low to inhibit microbial growth at ambient temperature, and packaging the dried product in discrete lengths in moisture-proof packages, the improvement which consists essentially of forming protein, lipid material and water into said substantially uniform mix by the steps of:
   (a) emulsifying at least one food grade lipid material in water using at least one proteinaceous non-meat food emulsifier to form an emulsion,
   (b) dispersing non-meat protein fibres constituting the sole proteinaceous texturing agent in an aqueous dispersion and/or solution of at least one non-meat proteinaceous binder to form a dispersion, and
   (c) mixing the emulsion formed in step (a) with the dispersion formed in step (b) to form said substantially uniform mix,
   the ingredients being used in proportions sufficient to provide a snack food product having the composition:

| | |
|---|---|
| Non-meat proteins | |
| - texturing protein | about 10 to about 70% by wt. |
| - binding and emulsifying protein | about 5 to about 65% by wt. |
| Water | about 5 to about 35% by wt. |
| Lipid material | about 10 to about 60% by wt. |
| Suitable spices, colouring agents and flavourings | up to about 15% by wt. |

2. In a method for the formation of a proteinaceous snack product by stuffing a substantially uniform mix of protein, lipid material, water, spices, seasonings and flavourings into a suitable casing, drying the stuffed material to a desired moisture content sufficiently low to inhibit microbial growth at ambient temperature, and packaging the dried product in discrete lengths in moisture-proof packages, the improvement which comprises:
   (i) forming protein, lipid material and water into said substantially uniform mix by the steps of:
      (a) emulsifying at least one food grade lipid material in water using at least one proteinaceous non-meat food emulsifier,
      (b) mixing the lipid emulsion with an aqueous dispersion and/or solution of at least one non-meat proteinaceous binder, and
      (c) providing at least one non-meat proteinaceous texturing agent including a granular textured vegetable protein and protein fibres substantially uniformly dispersed in the mixture resulting from steps (a) and (b);
   (ii) said proteinaceous texturing agent being provided in said mixture by dispersing said protein fibres in said aqueous dispersion and/or solution of at least one non-meat proteinaceous binder prior to mixing thereof with said emulsion and by dispersing said granular textured vegetable protein in said emulsion prior to step (b); and (iii) the ingredients being used in proportions sufficient to provide a snack food product having the composition:

| Non-meat proteins | |
|---|---|
| - texturing protein | about 10 to about 70% by wt. |
| - binding and emulsifying protein | about 5 to about 65% by wt. |
| Water | about 5 to about 35% by wt. |
| Lipid material | about 10 to about 60% by wt. |
| Suitable spices, colouring agents and flavourings | up to about 15% by wt. |

3. The method of claim 2 wherein sufficient granular textured vegetable protein is added to said emulsion that rehydration thereof forms a semi-solid meat fat-like product and said fat-like product is granulated prior to mixing step (b).

4. In a method for the formation of a proteinaceous snack product by stuffing a substantially uniform mix of protein, lipid material, water, spices, seasonings and flavourings into a suitable casing, drying the stuffed material to a desired moisture content sufficiently low to inhibit microbial growth at ambient temperature, and packaging the dried product in discrete lengths in moisture-proof packages, the improvement which comprises:

(i) forming protein, lipid material and water into said substantially uniform mix by the steps of:

(a) emulsifying at least one food grade lipid material in water using at least one proteinaceous non-meat food emulsifier, (b) heat setting at least part of said lipid emulsion to a semi-solid mass, (c) granulating said semi-solid mass, (d) mixing said granulated semi-solid mass and any of said lipid emulsion not heat set with an aqueous dispersion and/or solution of at least one non-meat proteinaceous binder, and (e) providing at least one non-meat proteinaceous texturing agent substantially uniformly dispersed in the mixture resulting from steps (a) to (d);

(ii) the ingredients are used in proportions sufficient to provide a snack food product having the composition:

| Non-meat proteins | |
|---|---|
| - texturing protein | about 10 to about 70% by wt. |
| - binding and emulsifying protein | about 5 to about 65% by wt. |
| Water | about 5 to about 35% by wt. |
| Lipid material | about 10 to about 60% by wt. |
| Suitable spices, colouring agents and flavourings | up to about 15% by wt. |

5. The method of claim 4 wherein all said lipid emulsion is heat set and additional lipid material is added to the mixture resulting from step (b).

6. The method of claim 1, 4 or 5 wherein said lipid material is a food grade liquid vegetable oil.

7. The method of claim 1, 2 or 4 wherein said product also contains:

| Antioxidant | up to about 1% by wt. |
|---|---|
| Salt | 0 to about 10% by wt. |
| Sugars | 0 to about 35% by wt. |
| Preservatives - | |
| - potassium sorbate | 0 to about 0.2% by wt. |
| - Sodium nitrite | 0 to about 0.02% by wt. |
| Antifoam agent | 0 to about 0.5% by wt. |
| Acidifying agent and/or bacterial culture | 0 to about 5% by wt. |

8. In a method for the formation of a proteinaceous sausage-like snack food product by stuffing a substantially uniform mix of protein, lipid material, water, and spices, seasonings and flavourings into a suitable casing, drying the stuffed material to a desired moisture content sufficiently low to inhibit microbial growth at ambient temperature, and packaging the dried product in discrete lengths in mositure-proof packages, the improvement which comprises:

(a) rapidly agitating at least one proteinaceous non-meat food emulsifier in water and mixing the same unitl the emulsifier protein is completely solvated, (b) emulsifying at least one food grade vegetable oil in the protein solution, (c) rapidly agitating at least one non-meat proteinaceous binder in water and mixing the same until the binder protein is completely solvated, (d) dispersing protein fibres in the resulting protein solution, (e) blending the emulsified oil with the fibre dispersion to form a blend, (f) adding a preservative solution to the blend, and (g) mixing and incorporating salt, sugars and the required spices and flavourings into the blend, the ingredients being used in proportions sufficient to provide a snack food product having the composition:

| Non-meat proteins | |
|---|---|
| - texturing protein | about 10 to about 70% by wt. |
| - binding and emulsifying protein | about 5 to about 65% by wt. |
| Water | about 5 to about 35% by wt. |
| Lipid material | about 10 to about 60% by wt. |
| Suitable spices, colouring agents and flavourings | up to about 15% by wt. |

9. The method of claim 8, wherein the ingredients are used in proportions sufficient to provide a snack food product having the composition:

| non-meat proteins | |
|---|---|
| - texturing proteins | about 30 to about 50 wt%. |
| - binding and emulsifying protein | about 10 to about 30 wt%. |
| water | about 15 to about 25 wt%. |
| spices, colours and flavourings | about 5 to about 10 wt%. |
| lipid material | about 25 to about 35 wt%. |
| salt | about 5 to about 6 wt%. |
| sugar | about 2 to about 4 wt%. |
| antioxidant | about 0.8 wt%. |
| preservatives- | |
| potassium sorbate | about 0.1 wt%. |
| sodium nitrite | about 0.02 wt %. |
| antifoam agent | about 0.01 wt%. |

10. The method of claim 8 wherein sodium nitrite is absent from said preservatives.

11. The method of claim 8 wherein said protein fibres are formed by injecting a protein micellar mass into hot water through a plurality of openings to form protein fibres by coagulation.

12. The method of claim 8 wherein said proteinaceous emulsifier comprises a protein micellar mass.

13. The method of claim 8 wherein said proteinaceous binder comprises a protein micellar mass.

14. The method of claim 11, 12 or 13 wherein said protein micellar mass is formed by:
   (a) extracting protein from proteinaceous material with an aqueous food grade salt solution at a temperature of about 15° to about 35° C., a salt concentration of at least 0.2 ionic strength and a pH of about 5.5 to about 6.5, and
   (b) decreasing the ionic strength of the protein solution to a value less than about 0.1 to precipitate and settle said protein micellar mass.

15. The method of claim 14 wherein said food grade salt solution has an ionic strength of about 0.2 to about 0.8 and said extraction is effected for about 10 to about 60 minutes.

16. The method of claim 14 wherein said protein is selected from the group consisting of plant proteins, animal proteins and microbial proteins.

17. The method of claim 14 wherein said proteins are selected from the group consisting of starchy cereals, starchy legumes and oil seeds.

18. In a method for the formation of a proteinaceous snack product by stuffing a substantially uniform mix of protein, lipid material, water, spices, seasonings and flavourings into a suitable casing, drying the stuffed material to a desired moisture content sufficiently low to inhibit microbial growth at ambient temperature, and packaging the dried product in discrete lengths in moisture-proof packages, the improvidement which comprises forming protein, lipid material and water into said substantially uniform mix by the steps of:
   (a) emulsifying at least one food grade lipid material in water using at least one proteinaceous non-meat food emulsifier to form an emulsion,
   (b) dispersing a granular textured vegetable protein in the emulsion formed in step (a) in sufficient quantity such that rehydration thereof forms a semi-solid fat-like product,
   (c) granulating said fat-like product to form granules of fat-like product, and
   (d) mixing said granules with an aqueous dispersion and/or solution of at least one non-meat proteinaceous binder to form said substantially uniform mix, the ingredients being used in proportions sufficient to provide a snack food product having the composition:

| | |
|---|---|
| Non-meat proteins | |
| - texturing protein | about 10 to about 70% by wt. |
| - binding and emulsifying protein | about 5 to about 65% by wt. |
| Water | about 5 to about 35% by wt. |
| Lipid material | about 10 to about 60% by wt. |
| Suitable spices, colouring agents and flavourings | up to about 15% by wt. |

* * * * *